US011386560B2

United States Patent
Fois et al.

(10) Patent No.: US 11,386,560 B2
(45) Date of Patent: Jul. 12, 2022

(54) SEGMENTATION OF THE CARDIAC REGION IN CT IMAGES

(71) Applicant: Bayer Aktiengesellschaft, Leverkusen (DE)

(72) Inventors: Franco Fois, Monheim (DE); Wei Liao, Frankfurt am Main (DE); Daniel Rechsteiner, Cologne (DE)

(73) Assignee: Bayer Aktiengesellschaft, Leverkusen (DE)

(*) Notice: Subject to any disclaimer, the term of this patent is extended or adjusted under 35 U.S.C. 154(b) by 82 days.

(21) Appl. No.: 17/073,989

(22) Filed: Oct. 19, 2020

(65) Prior Publication Data
US 2021/0118143 A1   Apr. 22, 2021

(30) Foreign Application Priority Data
Oct. 21, 2019   (EP) ...................................... 19204270

(51) Int. Cl.
G06K 9/00 (2022.01)
G06T 7/11 (2017.01)
G06V 10/40 (2022.01)
G06V 10/46 (2022.01)

(52) U.S. Cl.
CPC ................ G06T 7/11 (2017.01); G06V 10/40 (2022.01); G06T 2207/10081 (2013.01); G06T 2207/30048 (2013.01); G06T 2207/30101 (2013.01); G06V 10/467 (2022.01)

(58) Field of Classification Search
CPC ........................................................ G06T 7/11
See application file for complete search history.

(56) References Cited

U.S. PATENT DOCUMENTS

| 9,401,047 B2* | 7/2016 | Bogoni ................... G06T 19/00 |
| 2012/0237103 A1* | 9/2012 | Hu ............................ G06T 7/11 |
| | | 382/131 |
| 2020/0219237 A1* | 7/2020 | Ramsay ................. G16H 30/40 |
| 2020/0237331 A1 | 7/2020 | El Sayed | |
| 2021/0213304 A1* | 7/2021 | Domnik ................. G16H 20/40 |

FOREIGN PATENT DOCUMENTS

WO    2018202541 A1    11/2018

OTHER PUBLICATIONS

Frangi, A. et al. (1998). "Multiscale Vessel Enhancement Filtering," LNCS, 1496:130-137.
Khedmati, A. et al. (2016). "Semi-automatic detection of coronary artery stenosis in 3D CTA," IET Image Process. 10 (10):724-732.

* cited by examiner

*Primary Examiner* — Oneal R Mistry
(74) *Attorney, Agent, or Firm* — Morrison & Foerster LLP

(57) ABSTRACT

The present disclosure pertains to the analysis of the cardiac region in CT images. Provided herein are a method, a computer system and a computer program product for the segmentation of the cardiac region in CT images.

9 Claims, 1 Drawing Sheet

SEGMENTATION OF THE CARDIAC REGION IN CT IMAGES

CROSS REFERENCE TO RELATED APPLICATIONS

This application claims priority and benefit to European Application No.: 19204270.3, filed Oct. 21, 2019.

FIELD OF THE DISCLOSURE

The present disclosure deals with the analysis of the cardiac region in CT images. Subjects of the disclosure are a method, a computer system and a computer program product for the segmentation of the cardiac region in CT images.

BACKGROUND OF THE DISCLOSURE

Computed tomography (CT) is an X-ray method which depicts the human body in cross-sectional images (sectional imaging method). Compared to a conventional X-ray image, on which usually only coarse structures and bones are identifiable, CT images also capture in detail soft tissues with small differences in contrast. An X-ray tube generates a so-called X-ray fan beam, which penetrates the body and is attenuated to varying degrees within the body owing to the various structures, such as organs and bones. The receiving detectors opposite the X-ray emitter receive the signals of varying strength and forward them to a computer, which puts together cross-sectional images of the body from the received data. Computed tomography images (CT images) can be observed in 2D or else in 3D. For better differentiability of structures within the body of the person (e.g. vessels), a contrast agent can be injected into a vein before the generation of CT images.

Computed tomography is a commonly used method in the diagnosis of heart and lung diseases. In particular, computed tomography is an important method for identifying chronic thromboembolic pulmonary hypertension (CTEPH) in a patient. CTEPH is a special form of pulmonary hypertension (PH). It is characterized by the infiltration of thrombi into the pulmonary arteries. These clog and constrict the vessels.

SUMMARY OF THE DISCLOSURE

The CT images of persons suffering from CTEPH have characteristic features. It would be desirable if said characteristic features can be derived from CT images in an automated manner. This requires, first of all, an automated division of the cardiac region depicted in a CT image into individual segments, especially the separation of the pulmonary artery and the aorta from the ventricles.
The present invention attends to this problem.

The present disclosure provides, according to some embodiments, a method comprising:
receiving a CT image of a cardiac region of a person, the CT image depicting with contrast enhancement by means of a contrast agent a right ventricle, a left ventricle and blood vessels comprising a pulmonary artery and an aorta,
generating a cardiac-region binary image from the received CT image by application of a grey-scale threshold method,
generating two images from the cardiac-region binary image, a coarse-structure image by application of an objectness coarse filter and a fine-structure image by application of an objectness fine filter,
fitting the coarse-structure image into an atlas of a heart, wherein sectional areas for transitions from aorta and pulmonary artery to the ventricles are defined for the atlas of the heart,
applying the sectional areas to the fine-structure image, removing structures arising from the ventricles and, in doing so, generating a blood-vessel binary image,
applying the sectional areas to the cardiac-region binary image, removing structures arising from the blood vessels and, in doing so, generating a ventricle binary image,
displaying the blood-vessel binary image and/or the ventricle binary image on a screen and/or outputting the blood-vessel binary image and/or the ventricle binary image on a printer and/or storing the blood-vessel binary image and/or the ventricle binary image in a data storage medium.

According to some embodiments, the present disclosure provides a computer system comprising
a receiving unit
a control and calculation unit and
an output unit
the control and calculation unit being configured to prompt the receiving unit to receive a CT image of a cardiac region of a person, the CT image depicting with contrast enhancement by means of a contrast agent a right ventricle, a left ventricle and blood vessels comprising a pulmonary artery and an aorta,
the control and calculation unit being configured to generate a cardiac-region binary image from the received CT image by application of a grey-scale threshold method,
the control and calculation unit being configured to generate two images from the cardiac-region binary image, a coarse-structure image by application of an objectness coarse filter and a fine-structure image by application of an objectness fine filter,
the control and calculation unit being configured to fit the coarse-structure image into an atlas of a heart, wherein sectional areas for transitions from aorta and pulmonary artery to the ventricles are defined for the atlas of the heart,
the control and calculation unit being configured to generate a blood-vessel binary image by applying the sectional areas to the fine-structure image and removing structures in the fine-structure image that arise from the ventricles,
the control and calculation unit being configured to generate a ventricle binary image by applying the sectional areas to the cardiac-region binary image and removing structures in the cardiac-region binary image that arise from the blood vessels,
the control and calculation unit being configured to display the blood-vessel binary image and/or the ventricle binary image on a screen, to output it/them on a printer and/or to store it/them in a data storage medium.

The present disclosure provides, according to some embodiments, a computer program product comprising a data carrier on which there is stored a computer program which can be loaded into the memory of a computer system, where it prompts the computer system to execute:
receiving a CT image of a cardiac region of a person, the CT image depicting with contrast enhancement by means of a contrast agent a right ventricle, a left ventricle and blood vessels comprising a pulmonary artery and an aorta,
generating a cardiac-region binary image from the received CT image by application of a grey-scale threshold method, generating a coarse-structure image from the cardiac-region binary image by application of an objectness coarse filter, generating a fine-structure image from the cardiac-region binary image by application of an objectness fine filter, fitting the coarse-structure image into an atlas of a heart, wherein sectional areas for transitions from aorta and pulmonary artery to the ventricles are defined for the atlas of the heart, generating a blood-vessel binary image from the fine-structure image by application of the sectional areas to the fine-structure image and removal of structures from the fine-structure image that arise from the ventricles, generating a ventricle binary image from the cardiac-region binary image by application of the sectional areas to the cardiac-region binary image and removal of structures from the cardiac-region binary image that arise from the blood vessels, displaying the blood-vessel binary image and/or the ventricle binary image on a screen and/or outputting the blood-vessel binary image and/or the ventricle binary image on a printer and/or storing the blood-vessel binary image and/or the ventricle binary image in a data storage medium.

The disclosure will be described below without distinguishing between the subjects of the disclosure (method, computer system, computer program product). On the contrary, the following embodiments are intended to apply analogously to all the subjects of the disclosure, irrespective of in which context (method, computer system, computer program product) they occur.

If steps are stated in an order in the present description or in the claims, this does not necessarily mean that the disclosure is restricted to the stated order. On the contrary, it is conceivable that the steps can also be executed in a different order or else in parallel to one another, unless one step builds upon another step, thus absolutely requiring that the building step be executed subsequently (this being, however, clear in the individual case). The stated orders are thus preferred embodiments of the disclosure.

The present disclosure relates to the automated division of the cardiac region of a person, as depicted in a CT image, into individual segments (segmentation).

According to some embodiments, a contrast agent was intravenously administered beforehand to the person, also referred to as patient in this description, in order to enhance the contrast between, firstly, the blood vessels, through which contrast agent flows, and the ventricles in the cardiac region and, secondly, the bones and the remaining tissue.

Contrast agents for radiological (computed tomography) examinations are described in the prior art; a suitable contrast agent is, for example, iopromide, which is, for example, sold under the brand name Ultravist®.

Especially the interior of the aorta, the pulmonary artery and the ventricles is depicted with contrast enhancement as a result of such a contrast agent.

According to some embodiments of the invention, a three-dimensional CT image of the cardiac region of a person is received by the computer system. In the CT image, especially a right ventricle, a left ventricle, a pulmonary artery and an aorta are depicted with contrast enhancement by means of a contrast agent.

The CT image can, for example, be read from a data storage medium or transmitted from a CT scanner according to some embodiments. Furthermore, according to some embodiments, the computer system according to the invention is a component of a CT scanner or that a CT scanner is a component of the computer system.

According to some embodiments, such a CT image is present in the form of a digital three-dimensional graphic made up of a multiplicity of voxels, each voxel representing a volume element of the examination region and each voxel being assigned a grey value representing the X-ray absorption of the particular volume element. The X-ray absorption can, for example, be reported as a CT value. The CT number or CT value is reported in Hounsfield units (HU) on the Hounsfield scale. The CT value is based on the linear attenuation coefficient μ, which describes how monochromatic X-radiation is attenuated when penetrating matter along the path of irradiation.

Using the attenuation coefficient of the viewed tissue $\mu_T$ and of water $\mu_W$, the CT value is defined as $$CT := \frac{\mu_T - \mu_W}{\mu_W} \cdot 1000 \ HU$$

The scale is theoretically upwardly open. In practice, the range from −1024 HU to 3071 HU has gained acceptance; these 4096 grey levels can be described with a 12-digit binary number.

According to some embodiments, if a CT image is present in another form, it can be converted into the format described. For simplification, it is assumed in this description that CT images are present in the form described. However, this assumption is not in any way to be understood as limiting. It is clear to a person skilled in the art of image processing how the teaching of said description can be applied to CT images which are present in other image formats and/or in which the color values are coded differently. Therefore, the present disclosure is intended to encompass all formats in which CT images can be present.

According to some embodiments, in the CT image, the regions with contrast enhancement as a result of a contrast agent may be depicted with lightness. Bones exhibit a higher level of X-ray absorption than other human tissue and they therefore may be depicted with lightness in a CT image according to some embodiments.

According to some embodiments, the CT image firstly undergoes image processing in order to separate the structures with contrast enhancement as a result of the contrast agent from the remaining tissue, especially the bones. A grey-scale threshold method is suitable for this purpose. According to some embodiments, there may be an upper threshold and a lower threshold in a grey-scale threshold method. All voxels having a grey value within the range between the upper threshold and the lower threshold are set to the value of 1 (or to the highest tonal value supported by the available format), whereas the grey values of all remaining voxels are set to the value of 0. The reverse assignment is, of course, also conceivable. It is also conceivable that there is only a single threshold and that all voxels having a grey value below said threshold are set to the value of 0 and the grey values of the remaining voxels are set to the value of 1 (or to the highest tonal value supported by the available format).

The grey-scale threshold method is often also referred to as binarization, since the result is a binary image in which the grey values of the voxels assume only one of two possible values. In this connection, the value of 0 usually means "black" and the value of 1 "white".

The threshold values, or the threshold value if only one is used, are/is chosen such that the grey-scale threshold method generates a binary image on which the cardiac region is depicted and, by contrast, surrounding tissue is filtered out (cardiac-image binary image). According to some embodiments, the threshold value or the threshold values can be determined empirically. Since the grey levels in CT images may be calibrated according to the Hounsfield scale, the ascertained thresholds can be applied to CT images generated by a different CT scanner according to some embodiments.

Structures arising from the bones often still remain in the binary image. Especially the aorta frequently borders on the vertebral column, meaning that remaining structures of the vertebral column remain in the binary image. According to some embodiments, said structures can be reduced by means of a morphological filter (e.g. by means of erosion with or without subsequent dilation). Such filters are known to a person skilled in the art of image processing and described in detail in textbooks on the topic of image processing (see for example: J. Ohser: *Angewandte Bildverarbeitung und Bildanalyse* [Applied image processing and image analysis], Fachbuchverlag Leipzig, 2018, ISBN: 978-3-446-44933-6; A. Erhardt: *Einführung in die Digitale Bildverarbeitung* [Introduction to digital image processing], Vieweg+Teubner, 2008, ISBN: 978-3-519-00478-3; P. Soille: *Morphologische Bildverarbeitung* [Morphological image processing], Springer 1998, ISBN: 978-3-642-72191-5).

By means of a connected-component labelling method which can be applied to the filtered binary image, all voxels belonging to the heart or to the blood vessels can be labelled. Connected-component labelling methods are likewise extensively described in the literature (see for example: P. Johansen and S. Olsen: *Theory & Applications of Image Analysis*, Series in Machine Perception and Artificial Intelligence Vol. 2, World Scientific Publishing, 1992, ISBN: 981-02-0945-2; T. Y. Kong and A. Rosenfeld: *Topological Algorithms for Digital Image Processing*, Machine Intelligence and Pattern Recognition Vol. 19, Elsevier 1996, ISBN: 0-444-89754-2; I. Pitas: *Digital Image Processing Algorithms and Applications*, Wiley, 2000, ISBN: 0-471-37739-2).

According to some embodiments, in a further step, two further images are generated from the cardiac-region binary image: a coarse-structure image and a fine-structure image. Both the coarse-structure image and the fine-structure image are obtained by application of an objectness filter to the cardiac-region binary image. In the case of the coarse-structure image, an objectness coarse filter is applied to the cardiac-region binary image; in the case of the fine-structure image, an objectness fine filter is applied to the cardiac-region binary image.

Objectness filters are described in the literature. Preferably a multiscale vessel enhancement filter is concerned, as described, for example, by A. F. Frangi et al. (A. F. Frangi et al.: *Multiscale Vessel Enhancement Filtering*, Medical Image Computing and Computer Assisted Intervention, MICCAI 1998, Lecture Notes in Computer Science, Vol. 1496, Springer Verlag, Berlin, Germany, pp. 130-137). Particular preference is given to using the implementation of the multiscale vessel enhancement filter by L. Antiga in the Insight Segmentation and Registration Toolkit (ITK) (Luca Antiga, *Generalizing vesselness with respect to dimensionality and shape*, The Insight Journal, 2007, https://www.insight-journal.org/browse/publication/175). According to some embodiments, the width (sigma) of the Gaussian function is set to 3-5 in case of the objectness fine filter and to 10-30 in case of the objectness coarse filter.

As a result of the application of the objectness fine filter, the blood vessels are brought out (vessel enhancement). From the fine-structure image generated, the aorta and the pulmonary artery are extracted and segmented from one another in a later method step according to some embodiments.

As a result of the application of the objectness coarse filter, the ventricles and the transition regions in relation to the aorta and the pulmonary artery merge together to form a coarse structure, whereas parts of the aorta and the pulmonary artery beyond said transition regions are filtered out.

The application of a multiscale vessel enhancement filter as a coarse filter is a novel approach which has so far not yet been described in the literature. The coarse-structure image generated serves for the identification of the position and orientation of the heart and for the identification of the sectional areas of the transition from aorta and pulmonary artery to the ventricles, as described below.

The coarse-structure image shows a coarse structure of the heart together with regions of the aorta and pulmonary artery that are connected to the heart. Said coarse structure has a characteristic shape which is remotely reminiscent of a shoe. According to some embodiments, in a subsequent step, said coarse structure is fitted into an atlas of a heart (registration). Said step, which is part of an atlas-based segmentation, serves for the identification of the position and orientation of the heart and of the sectional areas of the transition from aorta and pulmonary artery to the ventricles and, according to some embodiments, for the subsequent segmentation of, firstly, ventricles and, secondly, pulmonary artery and aorta.

The atlas of the heart is a three-dimensional graphic showing a heart, with the sectional areas of the transitions from aorta and pulmonary artery to the ventricles being known (e.g. labelled) in said graphic. According to some embodiments, said heart atlas can, for example, be a CT image averaged (e.g. arithmetically averaged) over a plurality of cardiac CT images. According to some embodiments, the sectional areas can, for example, have been manually labelled/marked by a radiologist.

In the fitting (registration) procedure, the coarse structure of the heart in the coarse-structure image is transformed (rotation and/or translation) in order to achieve a mapping of the coarse structure of the heart onto the atlas. Details about atlas-based segmentation can be gathered from the technical and patent literature relating to this topic (see for example: S. Suhr: *Mathematische Bildregistrierung mit Anwendung in der Atlas-basierten Segmentierung* [Mathematical image registration with application in atlas-based segmentation], bachelor thesis for the attainment of the academic degree Bachelor of Science at Westfälische Wilhelms-Universität Münster, 2010; M. Schwenke et al.: *Atlasbasierte 3D-Segmentierung medizinischer Bilddaten mit Fast-Marching-Methoden* [Atlas-based 3D segmentation of medical image data using fast marching methods], Bildverarbeitung für die Medizin 2009 [Image processing for medicine 2009], Springer, ISBN: 978-3-540-93860-6, EP2819093A, WO2014/063746, EP2194505A).

When the transformation leading to a mapping of the coarse structure of the heart onto the atlas is found, said transformation is applied to the fine-structure image, and the sectional areas of the transitions from aorta and pulmonary artery to the ventricles, as are known from the atlas, are applied to the fine-structure image according to some embodiments. Lastly, according to some embodiments, the regions in the fine-structure image that are not attributable to the aorta and the pulmonary artery are removed from the fine-structure image, with the result that only the structures attributable to the aorta and the pulmonary artery remain in the image.

In an analogous manner and according to some embodiments, the transformation found and the sectional areas are applied to the cardiac-region binary image. Lastly, the regions in the cardiac-region binary image that are not attributable to the ventricles are removed from the cardiac-region image, with the result that only the structures attributable to ventricles remain in the image.

Up to this point, the blood vessels aorta and pulmonary artery have been separated from the ventricles: the blood-vessel binary image shows merely the aorta and the pulmonary artery; the ventricle binary image shows merely the ventricles.

According to some embodiments, the blood-vessel binary image and/or the ventricle binary image can be displayed on a screen, outputted on a printer and/or stored in a data storage medium for further use.

According to some embodiments, the ventricle binary image is further processed in order to separate the right ventricle from the left ventricle and to separate ventricle from the atrium and/or the blood-vessel binary image is further processed in order to separate the aorta from the pulmonary artery.

According to some embodiments, to identify aorta and pulmonary artery, a connected-component labelling method may be used. The result can be two images, a pulmonary-artery binary image depicting only the pulmonary artery and an aorta binary image depicting only the aorta. According to some embodiments, the result may be a binary image which shows both the aorta and the pulmonary artery and in which the aorta is, however, labelled differently from the pulmonary artery.

According to some embodiments, the pulmonary-artery binary image and/or the aorta binary image and/or the binary image showing the two differently labelled blood vessels can be displayed on a screen, outputted on a printer and/or stored in a data storage medium for further use.

According to some embodiments, the ventricles can, for example, be separated by an atlas-based segmentation method using a ventricle atlas, the ventricle atlas depicting typical ventricles (e.g. obtained by an arithmetic averaging of a plurality of ventricle images), the septum between the ventricles being known (e.g. labelled). The result of the separation are two images, a left-ventricle binary image depicting the left ventricle and a right-ventricle binary image depicting the right ventricle. According to some embodiments, it is also conceivable that the result is a binary image which shows both the right ventricle and the left ventricle and in which the right ventricle is, however, labelled differently from the left ventricle. According to some embodiments, a separation of ventricle and atrium is possible in this way, too.

According to some embodiments, the right-ventricle binary image and/or the left-ventricle binary image and/or the binary image showing the two differently labelled ventricles can be displayed on a screen, outputted on a printer and/or stored in a data storage medium for further use.

According to some embodiments, in a further step, the images generated can be used for identifying characteristic features of a disease in a patient. According to some embodiments, such a disease is a pulmonary hypertension, particularly preferably CTEPH.

A characteristic feature in patients suffering from CTEPH is the ratio of the volumes and/or the diameters of right ventricle and left ventricle (RV/LV ratio) (see, for example, Gonzales G et al. PLoS ONE 10(5): e0127797). A value of 0.9 or more in the RV/LV diameter ratio is an indication of the presence of CTEPH.

A further characteristic feature is the degree of curvature of the septum between the ventricles (see, for example, D. A. Moses et al., *Quantification of the curvature and shape of the interventricular septum*; Magnetic Resonance in Medicine, Vol. 52 (1), 2004, 154-163 and F. Haddad et al.: *Septal Curvature is a marker of hemodynamic, anatomical, and electromechanical ventricular interdependence in patients with pulmonary arterial hypertension*, Echocardiography Vol. 31(6) 2014, 699-707).

Furthermore, it is possible to determine the ratio of the diameters of the pulmonary artery and the aorta (PA:A ratio) in the plane of bifurcation of the pulmonary artery (see, for example, A. S. Iyer et al.: *CT scan-measured pulmonary artery to aorta ratio and echocardiography for detecting pulmonary hypertension in severe COPD*, CHEST 2014, Vol. 145(4), 824-832). A PA:A ratio of 0.7 or greater is a further indication of the presence of CTEPH.

According to some embodiments, the characteristic features can be identified by classic pattern-recognition methods. According to some embodiments, machine learning methods are also conceivable (e.g. artificial neural networks).

The present disclosure is carried out in full or in part with the aid of a computer system. A "computer system" is a system for electronic data processing that processes data by means of programmable calculation rules. According to some embodiments, such a system may comprise a "computer", that unit which comprises a processor for carrying out logical operations, and also peripherals.

In computer technology, "peripherals" refer to all devices which are connected to the computer and serve for the control of the computer and/or as input and output devices. Examples thereof are monitor (screen), printer, scanner, mouse, keyboard, drives, camera, microphone, loudspeaker, etc. Internal ports and expansion cards are, too, considered to be peripherals in computer technology.

Computer systems of today are frequently divided into desktop PCs, portable PCs, laptops, notebooks, netbooks and tablet PCs and so-called handhelds (e.g. smartphone); all these systems can be utilized for carrying out the invention.

According to some embodiments, the computer system according to the disclosure is configured to segment CT images of the cardiac regions of patients in an automated manner.

What is meant by "automated" is that no human intervention at all is required. Thus, according to some embodiments of the disclosure, a computer program is installed on a computer system which has access to computed tomography images of the cardiac region of patients and which segments the images in an automated manner without a person having to input parameters or to monitor the process.

A prerequisite for this is that the method steps implemented by the computer program are sufficiently robust for said steps to be able to be applied to a multiplicity of different images of the cardiac region of different patients and to lead to a segmentation. It has been found that the method steps described here perform this task reliably.

BRIEF DESCRIPTION OF THE DRAWINGS

The disclosure will now be described, by way of example only, with reference to the accompanying drawings, in which.

DETAILED DESCRIPTION OF EXEMPLARY EMBODIMENTS

Figure 1:
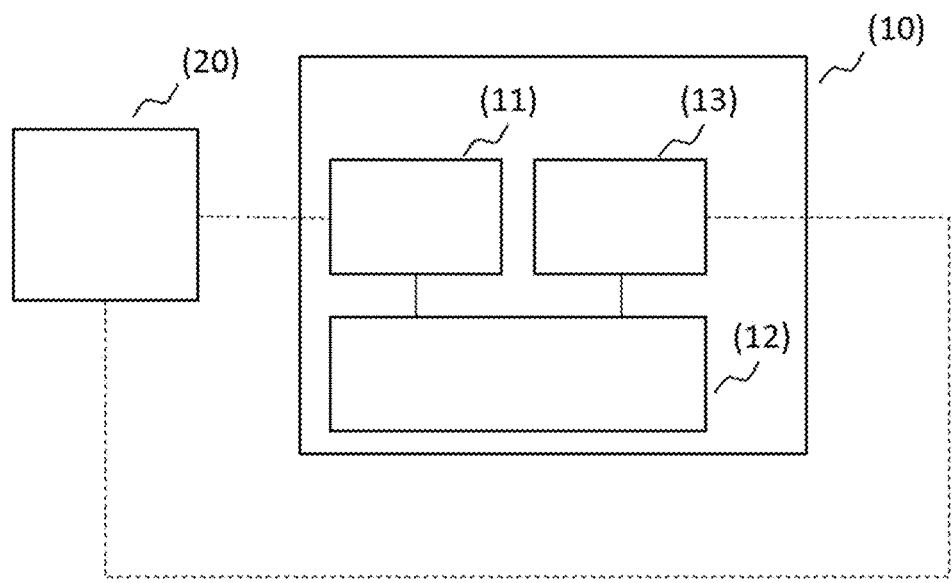
FIG. 1 shows an exemplary schematic of a computer system according to some embodiments.

The disclosure is described below with reference to figures, without wishing to restrict the invention to the features or combinations of features that are shown in the figures, where:

FIG. 1 shows an exemplary schematic of a computer system according to some embodiments. The computer system (10) comprises a receiving unit (11), a control and calculation unit (12) and an output unit (13).

Via the receiving unit (11), the computer system (10) receives CT images of the cardiac region of patients. In this description, the term "receive" is also intended to encompass the term "retrieve or read". According to some embodiments, the CT images can, for example, be read from a data storage medium (20), which can be a component of the computer system according to the disclosure or can be connected thereto via a network (depicted by the dashed lines).

From the receiving unit (11), the CT images are forwarded to the control and calculation unit (12), which undertakes the automated segmentation. The segmented images can then be outputted via the output unit (13), i.e. displayed on a monitor, outputted on a printer or stored in a data storage medium (e.g. the data storage medium (20)).

Figure 2:
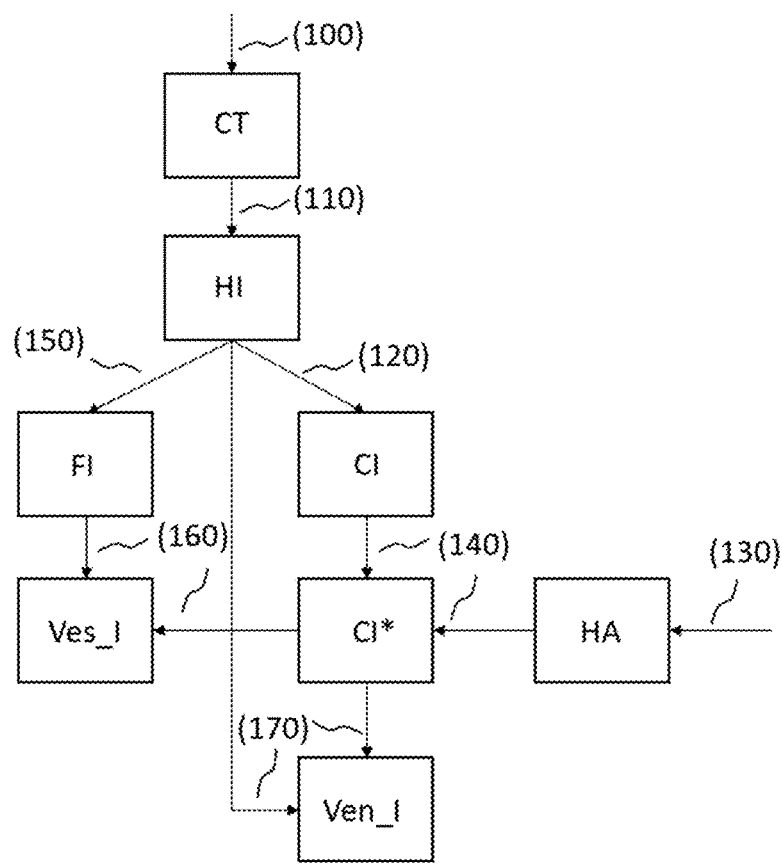
FIG. 2 shows an exemplary schematic of a flow chart that describes a method that can be executed by a computer system according to some embodiments.

FIG. 2 shows an exemplary schematic of a flow chart that describes a method that can be executed by a computer system according to some embodiments.

In step 100, a CT image (CT) of a cardiac region of a person is received.

In step 110, a cardiac-region binary image (HI) depicting the ventricles and the blood vessels is generated from the CT image (CT).

In step 120, a coarse-structure image (CI) is generated from the cardiac-region binary image (HI). The coarse-structure image (CI) shows a coarse structure of the heart together with regions of the aorta and pulmonary artery that are connected to the heart.

In step 130, an atlas (HA) of a heart is received. For the atlas (HA) of the heart, the sectional areas for the transitions of the aorta and the pulmonary artery to the ventricles are defined (e.g. labelled).

In step 140, the coarse structure of the heart in the coarse-structure image (CI) is fitted into the atlas. The result is a transformed coarse-structure image (CI*).

In step 150, a fine-structure image (FI) depicting the aorta and the pulmonary artery together with structures of the heart is generated from the cardiac-region binary image (HI).

In step 160, the transformation of the transformed coarse-structure image (CI*) and also the sectional areas from the atlas are applied to the fine-structure image (FI). Furthermore, structures arising from the ventricles are removed. The result is a blood-vessel binary image (Ves_I).

In step 170, the transformation of the transformed coarse-structure image (CI*) and also the sectional areas from the atlas are applied to the cardiac-region binary image (HI). Furthermore, structures arising from the blood vessels are removed. The result is a ventricle binary image (Ven_I).

The invention claimed is:

1. A method comprising:
receiving a CT image of a cardiac region of a person, the CT image depicting with contrast enhancement via a contrast agent a right ventricle, a left ventricle and blood vessels comprising a pulmonary artery and an aorta;
generating a cardiac-region binary image from the received CT image by application of a grey-scale threshold method;
generating two images from the cardiac-region binary image, a coarse-structure image by application of an objectness coarse filter and a fine-structure image by application of an objectness fine filter;
fitting the coarse-structure image into an atlas of a heart, wherein sectional areas for transitions from aorta and pulmonary artery to the ventricles are defined for the atlas of the heart;
applying the sectional areas to the fine-structure image, removing structures arising from the ventricles and, in doing so, generating a blood-vessel binary image;
applying the sectional areas to the cardiac-region binary image, removing structures arising from the blood vessels and, in doing so, generating a ventricle binary image; and
displaying the blood-vessel binary image and/or the ventricle binary image on a screen and/or outputting the blood-vessel binary image and/or the ventricle binary image on a printer and/or storing the blood-vessel binary image and/or the ventricle binary image in a data storage medium.

2. The method of claim 1, wherein the objectness coarse filter and the objectness fine filter are a multiscale vessel enhancement filter.

3. The method of claim 1, further comprising:
identifying and labelling aorta and pulmonary artery in the blood-vessel binary image by application of a connected-component labelling method and, in doing so, generating a pulmonary-artery binary image showing only the pulmonary artery and an aorta binary image showing only the aorta and/or a pulmonary-artery/aorta binary image which shows both the aorta and the pulmonary artery and in which the aorta is, however, labelled differently from the pulmonary artery; and
displaying the pulmonary-artery binary image and/or the aorta binary image and/or the pulmonary-artery/aorta binary image on a screen and/or outputting the pulmonary-artery binary image and/or the aorta binary image and/or the pulmonary-artery/aorta binary image on a printer and/or storing the pulmonary-artery binary image and/or the aorta binary image and/or the pulmonary-artery/aorta binary image in a data storage medium.

4. The method of claim 1, further comprising:
separating the ventricles in the ventricle binary image by an atlas-based segmentation method using a ventricle atlas and, in doing so, generating a left-ventricle binary image depicting only the left ventricle and a right-ventricle binary image depicting only the right ventricle and/or a left-ventricle/right-ventricle binary image which shows both the right ventricle and the left ventricle and in which the right ventricle is, however, labelled differently from the left ventricle; and
displaying the left-ventricle binary image and/or the right-ventricle binary image and/or the left-ventricle/right-ventricle binary image on a screen and/or outputting the left-ventricle binary image and/or the right-ventricle binary image and/or the left-ventricle/right-ventricle binary image on a printer and/or storing the left-ventricle binary image and/or the right-ventricle binary image and/or the left-ventricle/right-ventricle binary image in a data storage medium.

5. The method of claim 4, further comprising:

ascertaining a ratio of the volumes and/or the diameters of right ventricle and left ventricle based on the left-ventricle binary image and the right-ventricle binary image or the left-ventricle/right-ventricle binary image; and displaying the ratio on a screen and/or outputting the ratio on a printer and/or storing the ratio in a data storage medium.

6. The method of claim 4, further comprising:

ascertaining a degree of curvature of the septum between the left ventricle and the right ventricle based on the left-ventricle/right-ventricle binary image; and displaying the degree of curvature on a screen and/or outputting the degree of curvature on a printer and/or storing the degree of curvature in a data storage medium.

7. The method of claim 3, further comprising:

ascertaining a ratio of the diameters of the pulmonary artery and the aorta in the plane of bifurcation of the pulmonary artery based on the pulmonary-artery binary image and the aorta binary image or the pulmonary-artery/aorta binary image; and displaying the ratio on a screen and/or outputting the ratio on a printer and/or storing the ratio in a data storage medium.

8. A computer system comprising:

a receiving unit;

a control and calculation unit; and an output unit;

wherein the control and calculation unit is configured to:
  prompt the receiving unit to receive a CT image of a cardiac region of a person, the CT image depicting with contrast enhancement via a contrast agent a right ventricle, a left ventricle and blood vessels comprising a pulmonary artery and an aorta;
  generate a cardiac-region binary image from the received CT image by application of a grey-scale threshold method;
  generate two images from the cardiac-region binary image, a coarse-structure image by application of an objectness coarse filter and a fine-structure image by application of an objectness fine filter;
  fit the coarse-structure image into an atlas of a heart, wherein sectional areas for transitions from aorta and pulmonary artery to the ventricles are defined for the atlas of the heart;
  generate a blood-vessel binary image by applying the sectional areas to the fine-structure image and removing structures in the fine-structure image that arise from the ventricles;
  generate a ventricle binary image by applying the sectional areas to the cardiac-region binary image and removing structures in the cardiac-region binary image that arise from the blood vessels; and
  display the blood-vessel binary image and/or the ventricle binary image on a screen, to output it/them on a printer and/or to store it/them in a data storage medium.

9. A non-transitory computer readable medium storing in the memory one or more programs comprising instructions that, when executed by one or more processors of a system, cause the system to:

receive a CT image of a cardiac region of a person, the CT image depicting with contrast enhancement via a contrast agent a right ventricle, a left ventricle and blood vessels comprising a pulmonary artery and an aorta;

generate a cardiac-region binary image from the received CT image by application of a grey-scale threshold method;

generate a coarse-structure image from the cardiac-region binary image by application of an objectness coarse filter;

generate a fine-structure image from the cardiac-region binary image by application of an objectness fine filter;

fit the coarse-structure image into an atlas of a heart, wherein sectional areas for transitions from aorta and pulmonary artery to the ventricles are defined for the atlas of the heart;

generate a blood-vessel binary image from the fine-structure image by application of the sectional areas to the fine-structure image and removal of structures from the fine-structure image that arise from the ventricles;

generate a ventricle binary image from the cardiac-region binary image by application of the sectional areas to the cardiac-region binary image and removal of structures from the cardiac-region binary image that arise from the blood vessels; and display the blood-vessel binary image and/or the ventricle binary image on a screen and/or outputting the blood-vessel binary image and/or the ventricle binary image on a printer and/or storing the blood-vessel binary image and/or the ventricle binary image in a data storage medium.

* * * * *